United States Patent
Fujita et al.

(10) Patent No.: US 12,182,240 B2
(45) Date of Patent: Dec. 31, 2024

(54) AUTHENTICATION SYSTEM, MANAGEMENT DEVICE, AND AUTHENTICATION METHOD

(71) Applicant: Glory Ltd., Himeji (JP)

(72) Inventors: Yuichi Fujita, Himeji (JP); Shigenobu Nishida, Himeji (JP); Ayumi Kokubun, Himeji (JP); Sotaro Moriwaki, Himeji (JP)

(73) Assignee: GLORY LTD., Himeji (JP)

( * ) Notice: Subject to any disclaimer, the term of this patent is extended or adjusted under 35 U.S.C. 154(b) by 478 days.

(21) Appl. No.: 17/375,028

(22) Filed: Jul. 14, 2021

(65) Prior Publication Data

US 2021/0342433 A1    Nov. 4, 2021

Related U.S. Application Data

(63) Continuation of application No. PCT/JP2019/051070, filed on Dec. 26, 2019.

(30) Foreign Application Priority Data

Jan. 15, 2019 (JP) .................................. 2019-004321

(51) Int. Cl.
   *G06F 21/00* (2013.01)
   *G06F 21/32* (2013.01)
   *G06F 21/33* (2013.01)
(52) U.S. Cl.
   CPC .............. *G06F 21/32* (2013.01); *G06F 21/33* (2013.01)
(58) Field of Classification Search
   CPC .................. G06F 21/33; G06F 21/32
   USPC ........................................................... 726/7
   See application file for complete search history.

(56) References Cited

U.S. PATENT DOCUMENTS

| 7,366,329 | B2 | 4/2008 | Ono |
| 8,955,083 | B2* | 2/2015 | Ettorre .................... G06F 21/34 340/5.82 |
| 9,547,760 | B2* | 1/2017 | Kang ...................... G06F 21/32 |
| 2004/0151348 | A1 | 8/2004 | Ono |
| 2005/0213796 | A1 | 9/2005 | Ikoma et al. |

(Continued)

FOREIGN PATENT DOCUMENTS

| AU | 2017266971 A1 | 12/2018 |
| CN | 107 872 433 A | 4/2018 |

(Continued)

OTHER PUBLICATIONS

Extended European Search Report issued Jul. 25, 2022, in European Application No. 19909984.7.

(Continued)

*Primary Examiner* — Josnel Jeudy
(74) *Attorney, Agent, or Firm* — XSENSUS LLP

(57) ABSTRACT

An authentication system that includes a memory and processing circuitry. The processing circuitry is configured to manage a plurality of items of authentication information for authenticating a user; determine a usage type; select an authentication type, from among a plurality of authentication types, corresponding to the usage type; perform an authentication process for the user based on the authentication type; and output a result of authentication of the user.

15 Claims, 14 Drawing Sheets

(56) References Cited

U.S. PATENT DOCUMENTS

| | | | | |
|---|---|---|---|---|
| 2005/0287988 A1* | 12/2005 | Nakamura | ............ | H04M 1/66 |
| | | | | 455/411 |
| 2007/0177807 A1* | 8/2007 | Enomoto | ............ | G06V 10/772 |
| | | | | 382/190 |
| 2008/0028453 A1* | 1/2008 | Nguyen | ............ | H04L 63/102 |
| | | | | 726/10 |
| 2009/0100264 A1* | 4/2009 | Futa | ............ | H04L 9/0844 |
| | | | | 713/170 |
| 2016/0212125 A1 | 7/2016 | Pender | | |
| 2016/0212144 A1 | 7/2016 | Pender | | |
| 2017/0186011 A1* | 6/2017 | Lieberman | ....... | G06Q 20/40145 |
| 2017/0301353 A1* | 10/2017 | Mozer | ............ | G10L 17/02 |
| 2019/0102531 A1 | 4/2019 | Li et al. | | |
| 2019/0124065 A1* | 4/2019 | Hodge | ............ | G06Q 20/382 |
| 2019/0156003 A1* | 5/2019 | Alameh | ............ | G06F 21/32 |
| 2019/0236251 A1* | 8/2019 | Yang | ............ | H04W 12/06 |
| 2021/0335364 A1† | 10/2021 | Shirai | | |

FOREIGN PATENT DOCUMENTS

| | | | | |
|---|---|---|---|---|
| JP | 2000-90329 A | | 3/2000 | |
| JP | 2003-30452 A | | 1/2003 | |
| JP | 2003-248661 A | | 9/2003 | |
| JP | 2004096204 | * | 3/2004 | ............ G06F 15/00 |
| JP | 2004-139221 A | | 5/2004 | |
| JP | 2004-259255 A | | 9/2004 | |
| JP | 2005-258860 A | | 9/2005 | |
| JP | 2008-40961 A | | 2/2008 | |
| KR | 20170011482 | * | 2/2017 | ............ G06F 21/32 |
| WO | 2004/075097 A1 | | 9/2004 | |
| WO | 2015/179428 A1 | | 11/2015 | |

OTHER PUBLICATIONS

Office Action issued on Jan. 10, 2023, in corresponding Japanese patent Application No. 2019-004321, 10 pages.

International Search Report and Written Opinion mailed on Mar. 10, 2020, received for PCT Application PCT/JP2019/051070, Filed on Dec. 26, 2019, 8 pages including English Translation.

* cited by examiner
† cited by third party

FIG.3

AUTHENTICATION INFORMATION TABLE 24a

| USER ID | ATTRIBUTE INFORMATION | | | AUTHENTICATION INFORMATION | | | | SHARED SERVICE | | | ... |
| --- | --- | --- | --- | --- | --- | --- | --- | --- | --- | --- | --- |
| | NAME | ADDRESS | TELEPHONE NUMBER | MOVING IMAGE | KEY-WORD | VOICE PRINT INFOR-MATION | | FINANCIAL INSTITUTION ABC | SETTLEMENT SYSTEM DEF | PUBLIC SYSTEM GHI | ... |
| A123 | TARO TANAKA | TOKYO... | 03(1234)5678 | 🗎 | ... | ... | | ○ | ○ | ○ | ... |
| A456 | ICHIRO YAMAMOTO | TOKYO... | 03(9876)5432 | 🗎 | ... | ... | | ○ | — | ○ | ... |

FIG.4

AUTHENTICATION TYPE MANAGEMENT TABLE
24b

| AUTHEN-TICATION TYPE | FACE AUTHEN-TICATION | VOICE AUTHEN-TICATION 1 (ATTRIBUTE) | VOICE AUTHEN-TICATION 2 (KEYWORD) | VOICE AUTHEN-TICATION 3 (VOICEPRINT) | LIP AUTHEN-TICATION | IRIS AUTHEN-TICATION |
|---|---|---|---|---|---|---|
| 1 | ○ | — | — | — | — | — |
| 2 | ○ | ○ | — | — | — | — |
| 3 | ○ | — | ○ | — | — | — |
| 4 | ○ | — | — | ○ | — | — |
| 5 | ○ | — | ○ | — | ○ | — |
| 6 | ○ | — | — | ○ | ○ | — |
| 7 | ○ | — | ○ | ○ | ○ | ○ |

FIG.9

REGISTER ATTRIBUTE INFORMATION

| NAME | TARO TANAKA |
| --- | --- |
| ADDRESS | TOKYO ··· |
| TELEPHONE NUMBER | 03 (1234) 5678 |

[ BACK ]  [ CONTINUE ]

FIG.10

REGISTER SHARED SERVICE

| FINANCIAL INSTITUTION | ABC |
| --- | --- |
| BRANCH NAME | AKASAKA |
| ACCOUNT NUMBER | 1234567 |
| ELECTRONIC MONEY | DEF |
| IDENTIFICATION NUMBER | 1111111 |

⁚

AUTHENTICATION SYSTEM, MANAGEMENT DEVICE, AND AUTHENTICATION METHOD

CROSS-REFERENCE TO RELATED APPLICATIONS

The present application is a continuation of, and claims priority to, International application PCT/JP2019/051070, filed Dec. 26, 2019, which claims priority to JP 2019-004321, filed Jan. 15, 2019, and the entire contents of both are incorporated herein by reference.

TECHNICAL FIELD

The present disclosure relates to an authentication system, a management device, and an authentication method that efficiently performs, when a user performs various procedures, authentication (hereinafter, referred to as "personal authentication") of whether a person performing the procedures is the user themselves.

BACKGROUND

Conventionally, a bank account opening reception terminal device that receives applications for opening accounts of a plurality of banks in an unmanned manner has been known. For example, a bank account opening reception terminal device takes a picture of a face of an applicant and reads an identification card of the applicant. The bank account opening reception terminal device performs authentication of the applicant based on the face image and the identification card of the applicant.

Moreover, a technology for improving authentication accuracy by combining a plurality of types of authentication has been performed. For example, a first authentication unit performs a first type individual authentication of a person. Individual feature information of the person, who is an authentication target, obtained by an individual feature information extraction unit of the first authentication unit is used for setting a camera and a lighting position. Thereafter, a second authentication unit performs a second type individual authentication based on image data of the person to be authenticated taken by the camera.

SUMMARY

In an exemplary implementation of the present application, an authentication system includes an authentication system that includes a memory and processing circuitry. The processing circuitry is configured to manage a plurality of items of authentication information for authenticating a user; determine a usage type; select an authentication type, from among a plurality of authentication types, corresponding to the usage type; perform an authentication process for the user based on the authentication type; and output a result of authentication of the user.

BRIEF DESCRIPTION OF THE DRAWINGS

FIG. 3 is a diagram showing an example of an authentication information table shown in FIG. 2.

FIG. 4 is a diagram showing an example of an authentication type management table shown in FIG. 2.

FIG. 9 is a diagram showing a screen example (No. 3) of the mobile terminal at the time of initial registration.

FIG. 10 is a diagram showing a screen example (No. 4) of the mobile terminal at the time of initial registration.

DETAILED DESCRIPTION OF THE DRAWINGS

Figure 1:
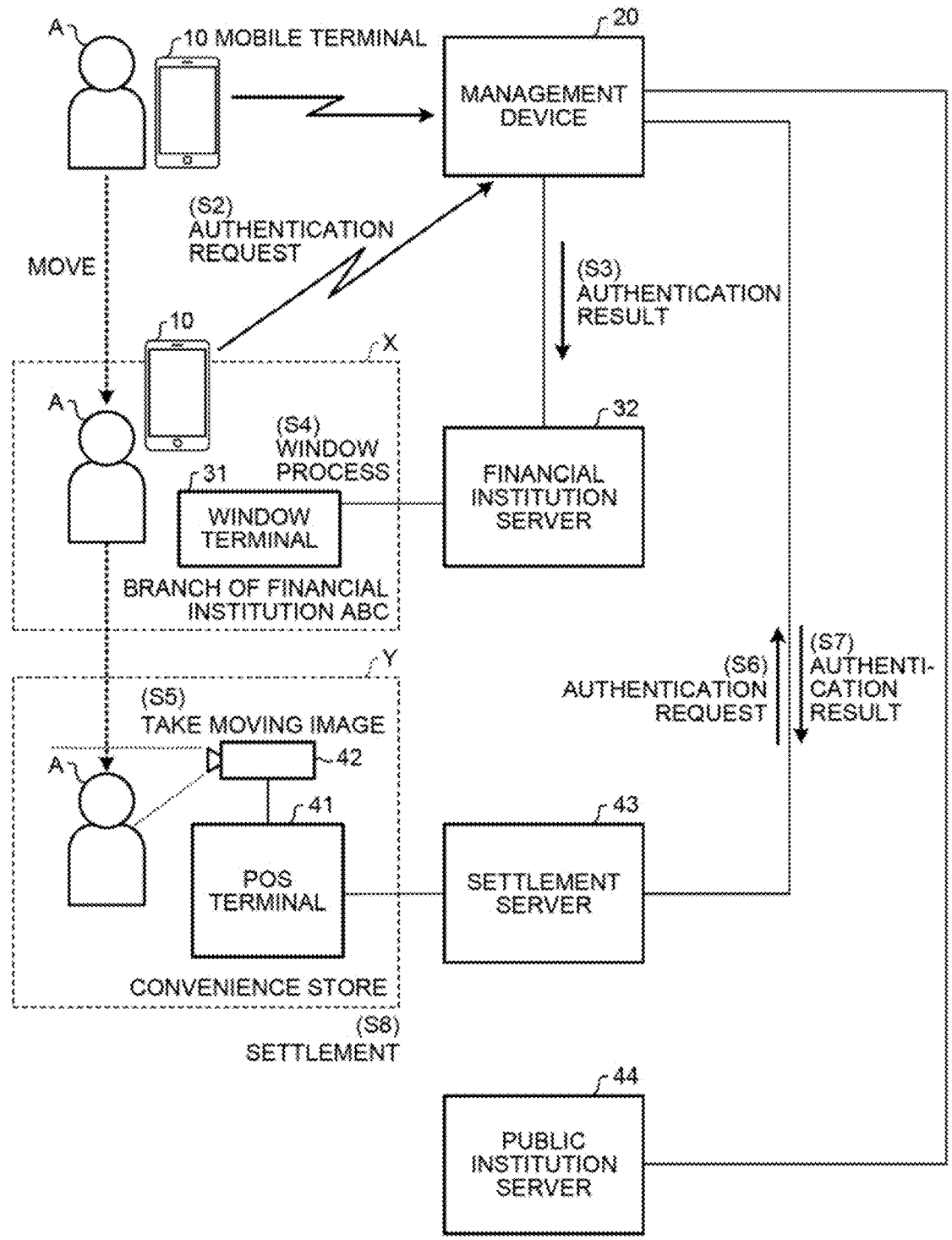
FIG. 1 is a diagram showing an outline of an authentication system according to Embodiment 1.

A conventional bank account opening reception terminal device performs authentication of a user based on a face image and an identification card of the user so that the user can open a new bank account. But, this technology cannot be used for settlement or internet banking other than opening an account. Authentication accuracy can be improved by combine a plurality of types of authentication, but such a process cannot handle a plurality of services having different authentication levels. For example, when a user changes their address, the user needs to perform a procedure for notifying a financial institution of address change, a procedure for notifying a public institution of moving-out and moving-in, a procedure of notifying each of other institutions of address change, etc.

Conventional technology cannot handle such procedures. The user has to go to the financial institution, the public institution, and other institutions to perform these procedures, and excessive effort is required to get involved in such procedures. In addition, the user needs to perform personal authentication individually in each of these procedures.

The inventors of the present disclosure have recognized these issues and developed technology to provide solutions to these issues, so as to perform personal authentication efficiently for various procedures. In one exemplary implementation of the present disclosure, an authentication system has an authentication information management unit configured to manage a plurality of items of authentication information for authenticating a user, and the authentication system includes: a usage type determination unit configured to determine a predetermined usage type; an authentication type selection unit configured to select an authentication type corresponding to the usage type determined by the usage type determination unit, from among a plurality of authentication types; an authentication processing unit configured to perform an authentication process for the user based on the authentication type selected by the authentication type selection unit; and a notification unit configured to notify a result of authentication of the user by the authentication processing unit.

Hereinafter, embodiments of the authentication system, the management device, and the authentication method according to the present disclosure will be described with reference to the accompanying drawings. In Embodiments 1 and 2, the case of providing an authentication service using a management device that serves as a server device of a client-server system is described, but the present disclosure is not limited thereto. For example, the present disclosure can also be applied to the case of providing an authentication service on a cloud system.

Embodiment 1

<Outline of Authentication System According to Embodiment 1>

First, an outline of an authentication system according to Embodiment 1 will be described. The authentication system according to Embodiment 1 performs a service of a personal authentication by using face authentication with moving images, voice authentication, etc. That is, the authentication system according to Embodiment 1 can prove that a user is authentic, to a third party by performing an authentication process using dynamic biometric information after the user registers the face and the voice of the user in advance in the system.

Specifically, an official certificate including a face image of the user is registered in the authentication system in advance. For example, the My Number Card (social security card) or the driver's license can be used as the official certificate. The authentication system performs authentication of whether the face image included in the registered official certificate is the same as a face image of the user taken by, for example, a mobile terminal 10, through face authentication. The authentication system causes the user to utter the name of the user or a keyword on an authentication application in the mobile terminal 10, and performs authentication of whether the name or keyword obtained by voice recognition of this voice is the same as that in the official certificate. The authentication system performs authentication of whether the voiceprint included in the voice uttered on the authentication application in the mobile terminal 10 is the same as a voiceprint of the user registered in advance. The authentication system performs lip authentication of whether each phoneme included in the voice matches the movement of the lip of the user. The authentication system performs authentication of whether a user is authentic by performing dynamic biometric authentication including a plurality of types of authentication among above described various types of authentication.

For example, when the user changes their address, the user performs initial registration in the authentication system. The initial registration improves the efficiency of personal authentication required for a procedure of the address change when the user performs the procedure at each financial institution by using the authentication system. In addition to the financial institutions, the efficiency of personal authentication can be improved in various situations such as, when purchasing items at convenience stores, when performing address change procedures at public institutions, when purchasing meal tickets at automatic ticket vending machines in employee cafeterias, etc. The authentication system can change an authentication type to be used, depending on the usage type of services the user uses.

The outline of the authentication system according to Embodiment 1 will be specifically described with reference to FIG. 1. FIG. 1 is a diagram showing the outline of the authentication system according to Embodiment 1. The case where a user A performs initial registration for an authentication service at home or the like, then moves to a branch X of a financial institution ABC to receive the authentication service, and moves to a convenience store Y to receive the authentication service, will be described.

The authentication system shown in FIG. 1 performs, when the user A uses various services, personal authentication corresponding to the usage type under a condition that the user A resisters, in advance, a moving image, attribute information, and a service selected by the user. Specifically, an authentication type corresponding to the usage type is selected from among a plurality of authentication types, and an authentication process of the selected authentication type is performed.

A management device 20 which forms the core of this authentication system can communicate with the mobile terminal 10 of the user A. The mobile terminal 10 is a terminal device such as a smartphone, a tablet, etc. The mobile terminal 10 accesses the management device 20 by, for example, 4G standard LTE (Long Term Evolution) communication or WiFi communication.

The management device 20 is communicably connected to a financial institution server 32 of a certain financial institution, a settlement server 43 of a certain settlement system, and a public institution server 44 of a public institution. The financial institution server 32 enables internet banking using the mobile terminal 10 of the user. The settlement server 43 manages the amount of electronic money and the like of each user. The public institution server 44 manages the resident list and the like of a municipality.

The management device 20 has a function of determining a usage type, a function of selecting an authentication type corresponding to the determined usage type from among a plurality of authentication types, a function of performing an authentication process for the user A based on the selected authentication type, and a function of notifying the authentication result of the user A. The authentication corresponding to the usage type means that authentication corresponding to a usage scene of the user A is performed. For example, when the user A is present at the branch X of the financial institution ABC, it is not good to utter personal information such as the name of the user A. Therefore, the management device 20 selects an authentication type that uses a moving image including utterance of a keyword that does not include the personal information. Meanwhile, when the user A is present at home, the management device 20 selects an authentication type that uses a moving image including utterance of the personal information. For example, when the user A purchases a low-priced item at the convenience store Y, the management device 20 selects an authentication type that can be performed in a relatively easy way using a moving image. Meanwhile, when the user A withdraws a large amount of money at the branch X of the financial institution ABC, the management device 20 selects an authentication type that is performed highly accurately by using a moving image.

When the user A needs to receive the authentication service of the authentication system, the user A accesses the management device 20 by using the mobile terminal 10 possessed by the user A to perform initial registration (step S1). Embodiment 1 describes the case where the user A downloads an authentication application for the authentication service from the management device 20 or a predetermined website by using the mobile terminal 10, launches the authentication application on the mobile terminal 10, and performs the initial registration, but the user A may directly access the management device 20 and perform the initial registration on the website. In the initial registration, the user registers a moving image including a face image and a voice, attribute information, a selected service, account information of a bank account, the My Number (social security number), etc., of the user. The initial registration will be described in detail later.

Thereafter, the user A moves to the branch X of the financial institution ABC. For example, the user A performs a procedure of changing the address of the bank account or a procedure of opening a new bank account of the changed address. A bank teller who operates a window terminal 31 at a teller window calls the user A, and the user A launches the authentication application in the mobile terminal 10, performs a login operation, accesses the management device 20, and makes an authentication request (step S2). The management device 20 that has received the authentication request performs an authentication process for the user A. Specifically, the management device 20 selects an authentication type matching the usage type from among the plurality of authentication types, and performs an authentication process corresponding to the selected authentication type. The authentication process is performed by using a moving image. The authentication process will be described in detail later.

The management device 20 notifies the financial institution server 32 of the financial institution ABC of the authentication result (step S3). If the financial institution server 32 receives a notification of the authentication result indicating that the user A is an authenticated user, the financial institution server 32 subsequently performs processes for the teller window, such as changing the address of the bank account, opening a new bank account of the changed address, etc. (step S4). Accordingly, the financial institution ABC can perform various procedures while preventing user spoofing. Here, the case where an authentication request is made from the mobile terminal 10 of the user A to the management device 20 has been described, but in the case where the window terminal 31 is provided with a function of obtaining a moving image and a function of making an authentication request, an authentication request can also be made from the window terminal 31 to the management device 20.

When the user A moves to the convenience store Y and purchases an item, a camera 42 connected to a POS terminal 41 in the store Y takes a moving image of the user A (step S5). The POS terminal 41 uses this moving image to make an authentication request to the management device 20 (step S6). The management device 20 that has received the authentication request performs an authentication process for the user A. The management device 20 selects an authentication type matching the usage type from among the plurality of authentication types, and performs an authentication process corresponding to the selected authentication type. The authentication process is performed by using the moving image.

The management device 20 notifies the settlement server 43 of the authentication result (step S7). If the settlement server 43 receives a notification of the authentication result indicating that the user A is an authenticated user, the settlement server 43 notifies the POS terminal 41 that it is possible to settle the purchased item by electronic money, automatic deduction from the bank account by the financial institution ABC, or the like. Then, the settlement is performed in the POS terminal 41 (step S8). Therefore, for example, even when the battery of the mobile terminal 10 of the user A runs out or the user A loses the mobile terminal 10, the user A can purchase an item. In particular, even when the mobile terminal 10 cannot be used due to a disaster or the like, the user A can purchase an item if a moving image of the user A can be obtained at the store Y. Similar to the case of the financial institution ABC, an authentication request can also be made by the mobile terminal 10 of the user A.

As described above, in the authentication system according to Embodiment 1, the user A accesses the management device 20 through the mobile terminal 10 and performs initial registration including registration of a user's moving image. When the user A uses a service at the branch X of the financial institution ABC or at the convenience store Y, a moving image is transmitted to the management device 20. The management device 20 performs the authentication process corresponding to the usage type and notifies the branch or the store of the authentication result. Accordingly, the personal authentication can be efficiently performed in the various procedures for the user A. Although the detailed description thereof is omitted for convenience of description, when a procedure at a public institution such as a city hall needs to be performed, an authentication result can be notified from the management device 20 to the public institution server 44.

<Configuration of Management Device 20>

Figure 2:
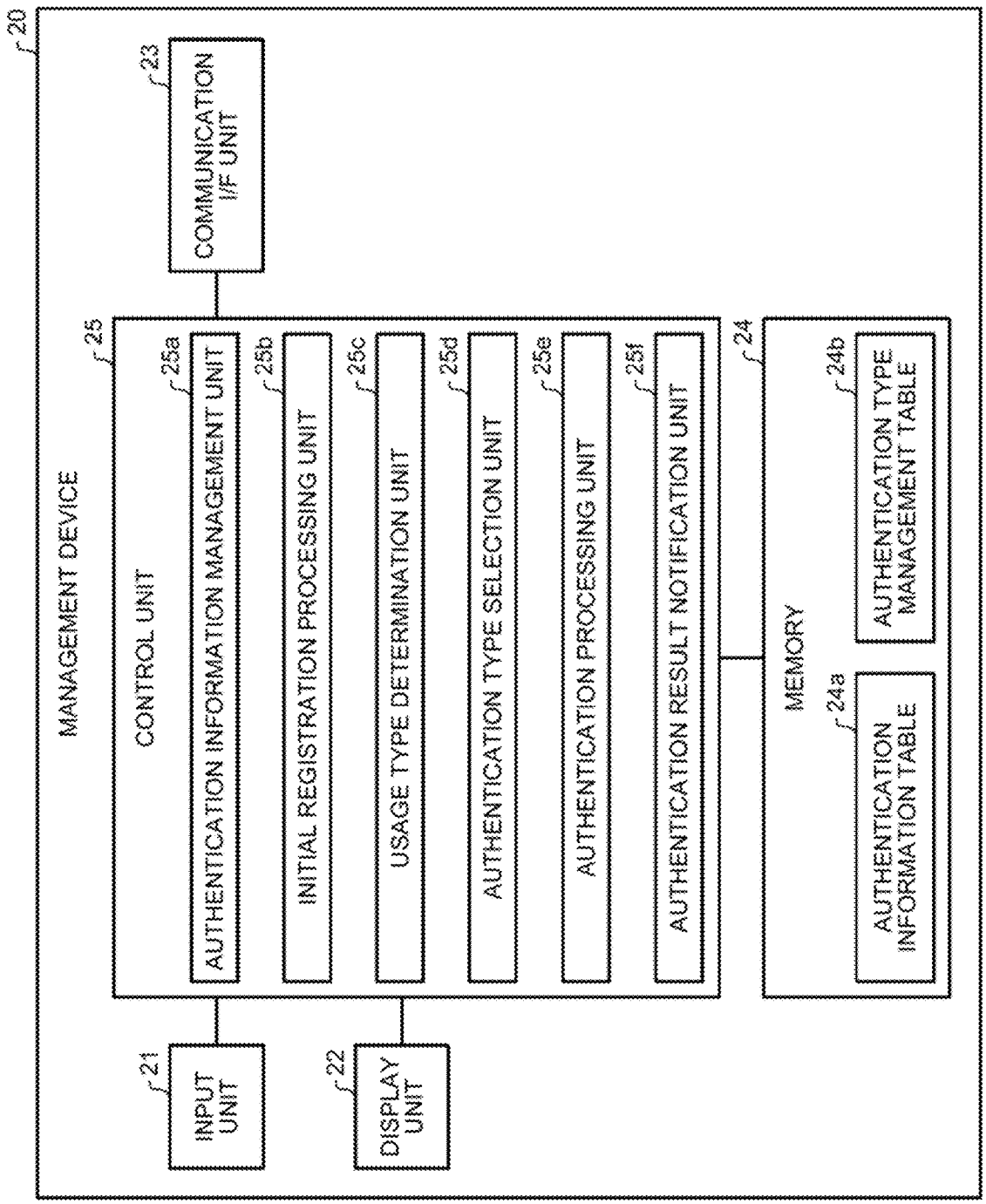
FIG. 2 is a functional block diagram showing the configuration of a management device shown in FIG. 1.

Next, the configuration of the management device 20 shown in FIG. 1 will be described. FIG. 2 is a functional block diagram showing the configuration of the management device 20 shown in FIG. 1. As shown in FIG. 2, the management device 20 includes an input unit 21, a display unit 22, a communication I/F unit 23, a memory 24, and a control unit 25.

The input unit 21 is an input device such as a keyboard and a mouse. The display unit 22 is a display device such as a liquid crystal panel or a liquid crystal display. The communication I/F unit 23 performs communication with the mobile terminal 10, etc.

The memory 24 is a secondary storage unit such as a hard disk drive or a non-volatile memory. The memory 24 stores an authentication information table 24a and an authentication type management table 24b. The authentication information table 24a includes attribute information, authentication information, information about a shared service, etc., for each user identification information that uniquely identifies a user. The attribute information includes personal information such as the name, the address, and the telephone number of the user. The authentication information includes a moving image including the face and the voice of the user, iris information of the user, etc. The information about the shared service includes system types to which the authentication system is applied.

FIG. 3 is a diagram showing an example of the authentication information table 24a shown in FIG. 2. As shown in FIG. 3, attribute information of a name "TARO TANAKA", an address " . . . (omitted) . . . Tokyo", and a telephone number "03(1234)5678" is associated with a user ID "A123". The attribute information can also include the phonetic characters of the name of the user, the age of the user, the phone number of the mobile terminal 10, an e-mail address, etc.

As the authentication information, a moving image including a face and a voice, etc., are associated with the user ID "A123". For example, the user utters five different types of keywords at the time of initial registration, a moving image of the user uttering each keyword is taken, and these five types of moving images are associated with the user ID "A123". In addition, the plurality of keywords uttered by the user are registered so as to be associated with the user ID "A123". For example, if a sentence "What school did you graduate from?" is displayed on the display unit of the mobile terminal 10 and the user utters "X University", the "X University" obtained by the voice recognition is registered as a keyword. If a sentence "What is your mother's name?" is displayed on the display unit of the mobile terminal 10 and the user utters "HANAKO", the "HANAKO" obtained by the voice recognition is registered as a keyword.

Similarly, voiceprint information of the user is registered. A sentence having a predetermined length is displayed on the display unit of the mobile terminal 10, the user reads the sentence aloud, and voiceprint information of the user obtained by analyzing the voice data is registered in the authentication information table 24a. As the voiceprint information, one or both of the acoustic feature values (frequency characteristics) and the linguistic feature values (phoneme arrangement characteristics) of the voice are acquired. As for these moving image, keywords, and voiceprint information, data itself can be stored in the authentication information table 24a, or link information to each data file can be stored therein. The iris information of the user is stored as authentication information.

FIG. 3 shows a case in which, the financial institution ABC, a settlement system DEF, and a public system GHI are associated with the user ID "A123" as the shared services. A branch name and an account number can be stored for the financial institution ABC, an identification number for electronic money can be stored for the settlement system DEF, and the identification number in the My Number Card (the social security number in the social security card) can be stored for the public system GHI.

Similarly, attribute information including a name "ICHIRO YAMAMOTO", an address " . . . (omitted) . . . Tokyo", and a telephone number "03(9876)5432", authentication information including a moving image including a face and a voice, and information about a shared service are registered for a user ID "A456". For the user ID "A456", the settlement system DEF is excluded from the shared services.

The authentication type management table 24b is a table showing combinations of authentications corresponding to each of a plurality of authentication types. In the authentication system according to Embodiment 1, an authentication type corresponding to a usage type such as a usage scene of the user is selected from among the plurality of authentication types, and an authentication process for the user is performed based on the selected authentication type. The plurality of authentication types are registered in the authentication type management table 24b in advance such that an authentication type corresponding to the usage type can be selected easily.

FIG. 4 is a diagram showing an example of the authentication type management table 24b shown in FIG. 2. As shown in FIG. 4, an authentication type 1 is an authentication type in which an authentication process is performed through face authentication. An authentication type 2 is an authentication type in which dynamic biometric authentication is performed through face authentication and voice authentication 1 (attribute). The voice authentication 1 (attribute) means an authentication process of determining whether attribute information (for example, name) included in a voice uttered by the user matches the attribute information of the user.

An authentication type 3 is an authentication type in which dynamic biometric authentication is performed through face authentication and voice authentication 2 (keyword). The voice authentication 2 (keyword) means an authentication process of displaying a question whose correct answer is known only by the user on the display unit of the mobile terminal 10, and determining whether a keyword is included in a voice recognition result of the user's answer to the question. For example, in the authentication process, a sentence "What school did you graduate from?" is displayed on the display unit of the mobile terminal 10, "X University" is uttered by the user, and it is determined whether the voice-recognized "X University" is registered as a keyword in the authentication information table 24a.

An authentication type 4 is an authentication type in which dynamic biometric authentication is performed through face authentication and voice authentication 3 (voiceprint). For example, in the authentication process, a sentence "Please read aloud the sentence shown below" is displayed on the display unit of the mobile terminal 10, voiceprint information is acquired from a voice obtained through the reading by the user, and it is determined whether the acquired voiceprint information matches the voiceprint information registered in the authentication information table 24a.

Figure 5:
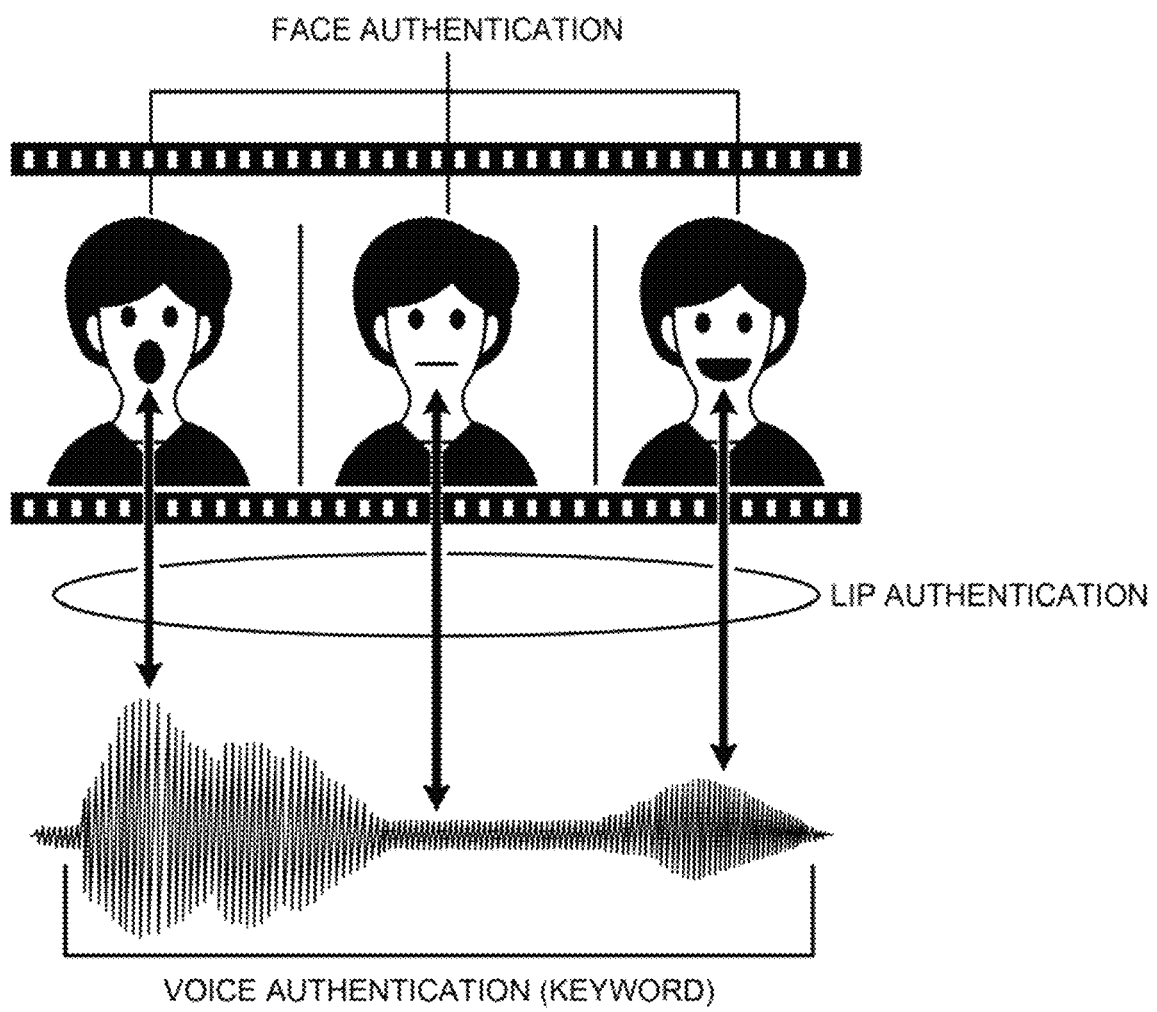
FIG. 5 illustrates an authentication process of an authentication type 5 shown in FIG. 4.

An authentication type 5 is an authentication type in which dynamic biometric authentication is performed through face authentication, the voice authentication 2 (keyword), and lip authentication. The lip authentication is an authentication process of authenticating whether phonemes obtained through utterance by the user match the movement of the mouth of the user. FIG. 5 illustrates an authentication process of the authentication type 5 shown in FIG. 4. As shown in FIG. 5, in the dynamic biometric authentication of the authentication type 5, a face authentication process is performed by using the face included in a moving image, and the voice authentication (keyword) is performed as described above, based on the voice included in the moving image. Furthermore, an authentication process of whether the user has truly spoken is performed based on the correspondence relationship between the movement of the mouth and the lip included in each image forming the moving image and the phonemes included in the voice. Accordingly, fraudulent reproduction of a recorded voice prepared in advance can be prevented.

An authentication type 6 is an authentication type in which dynamic biometric authentication is performed through face authentication, the voice authentication 3 (voiceprint), and lip authentication. An authentication type 7 is an authentication type in which dynamic biometric authentication is performed through face authentication, the voice authentication 2 (keyword), the voice authentication 3 (voiceprint), lip authentication, and iris authentication. The authentication type 7 is an authentication type adopted when advanced individual authentication for accurately identifying an individual is required. As described above, in Embodiment 1, seven levels of authentication types, that is, the authentication types 1 to 7, are provided, and the closer to the authentication type 7, the higher the authentication level. The above described authentication types 1 to 7 are examples, and each authentication type may be obtained by freely combining the plurality of authentication. In addition to the illustrated authentication, various types of authentication with personal biometric information such as fingerprint authentication and palm print authentication can also be combined.

Returning to the description of FIG. 2, the control unit 25 controls the entirety of the management device 20. The control unit 25 includes an authentication information management unit 25a, an initial registration processing unit 25b, a usage type determination unit 25c, an authentication type selection unit 25d, an authentication processing unit 25e, and an authentication result notification unit 25f. In actuality, programs corresponding to these functional units are stored in a ROM or a nonvolatile memory, and these programs are loaded to a CPU and executed, thereby causing the CPU to perform processes corresponding to the authentication information management unit 25a, the initial registration processing unit 25b, the usage type determination unit 25c, the authentication type selection unit 25d, the authentication processing unit 25e, and the authentication result notification unit 25f.

The authentication information management unit 25a manages the authentication information for each user by using the authentication information table 24a stored in the memory 24. As described above, the attribute information, the authentication information, the shared service, etc., of each user are registered in the authentication information table 24a. The authentication information management unit 25a performs a process of updating these items of information, etc.

The initial registration processing unit 25b performs initial registration when the user newly uses the authentication system. In Embodiment 1, a user who newly uses the authentication system downloads a predetermined authentication application from the management device 20 or a predetermined web server by using the mobile terminal 10, and launches the authentication application on the mobile terminal 10. Then, a confirmation document such as the driver's license, attribute information such as the name of the user, authentication information such as a moving image, and a shared service are registered through the authentication application. Although the case of using the authentication application is shown here, the user can access an HTTP server by using a web browser, and perform the initial registration on the web browser.

The usage type determination unit 25c determines the usage type based on the situation and the like of the user. For example, when the user is performing a procedure of changing the address or opening an account at a financial institution, the usage type determination unit 25c determines that the usage type is "financial institution handling". For example, when the user is performing a procedure of sending a large amount of money or sending money abroad at a financial institution, the usage type determination unit 25c determines that the usage type is "remittance of high amount". As described above, the usage type determination unit 25c determines the usage type corresponding to the situation of the user.

The authentication type selection unit 25d selects an authentication type corresponding to the usage type determined by the usage type determination unit 25c. For example, when the usage type determination unit 25c determined that the usage type is "remittance of high amount", the authentication type selection unit 25d selects the authentication type 7 having a high authentication level. For example, when an authentication type is to be selected for an automatic ticket vending machine in a company cafeteria, the authentication type selection unit 25d selects the authentication type 1 of the simple authentication process, for a user who used the company cafeteria within the last two months, and selects the authentication type 2 for a user who has not used the company cafeteria over the last two months or longer. For example, the authentication type selection unit 25d selects the authentication type 2 when the user is present at home, and selects the authentication type 3 when the user is not present at home. This is because it is not appropriate, from the viewpoint of protection of personal information, to make the user utter attribute information such as the name when the user is present at a location other than the home. It is noted that a table may be previously prepared to indicate the correspondence relationship between the authentication type and the usage type. Alternatively, it can be set that the authentication type is selected for the usage type by using a technique such as deep learning.

The authentication processing unit 25e performs an authentication process corresponding to the authentication type selected by the authentication type selection unit 25d. For example, when the authentication type 5 is selected by the authentication type selection unit 25d, the authentication processing unit 25e performs dynamic biometric authentication including a face authentication, a voice authentication (keyword), and a lip authentication, by using a moving image of the user. The face authentication, the voice authentication (keyword), and the lip authentication are well known and therefore the detailed description is omitted.

The authentication result notification unit 25f notifies the result of the authentication process performed by the authentication processing unit 25e. The notification destination of the authentication result is not limited to the mobile terminal 10. The window terminal 31 of the financial institution, the settlement server 43, etc., can also be notification destinations.

<Initial Registration Process>

Figure 6:
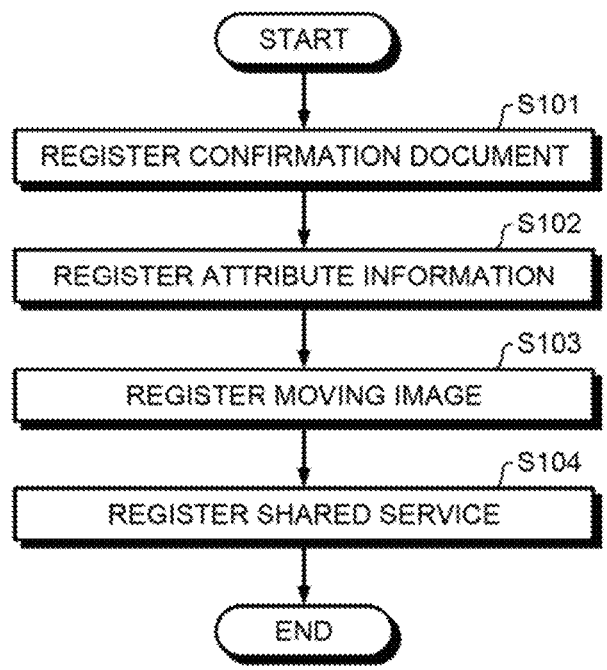
FIG. 6 is a flowchart showing a processing procedure at the time of initial registration.
Figure 7:
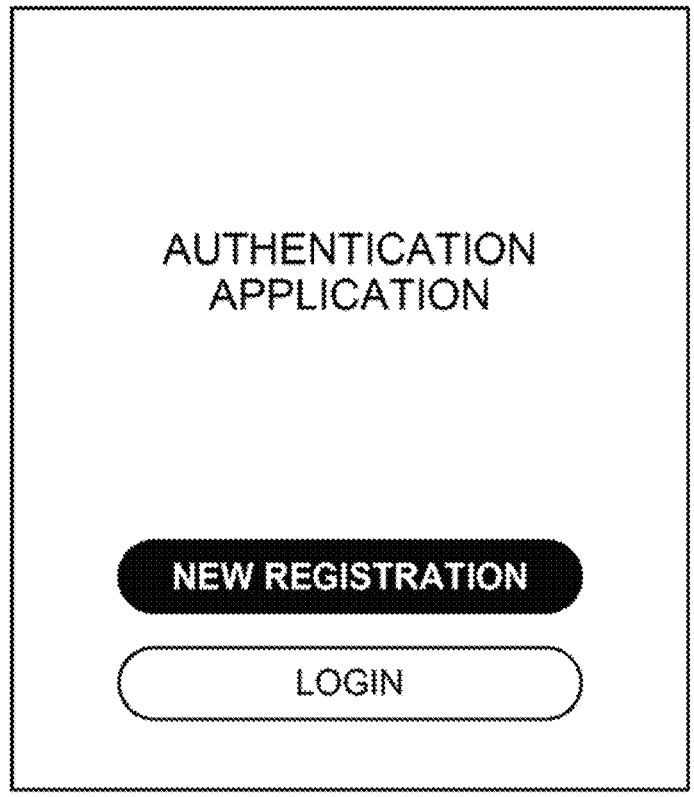
FIG. 7 is a diagram showing a screen example (No. 1) of a mobile terminal at the time of initial registration.

Next, an initial registration process by the management device 20 will be described. FIG. 6 is a flowchart showing a processing procedure at the time of initial registration. FIG. 7 to FIG. 10 are diagrams showing screen examples of the mobile terminal 10 at the time of initial registration.

Figure 8:
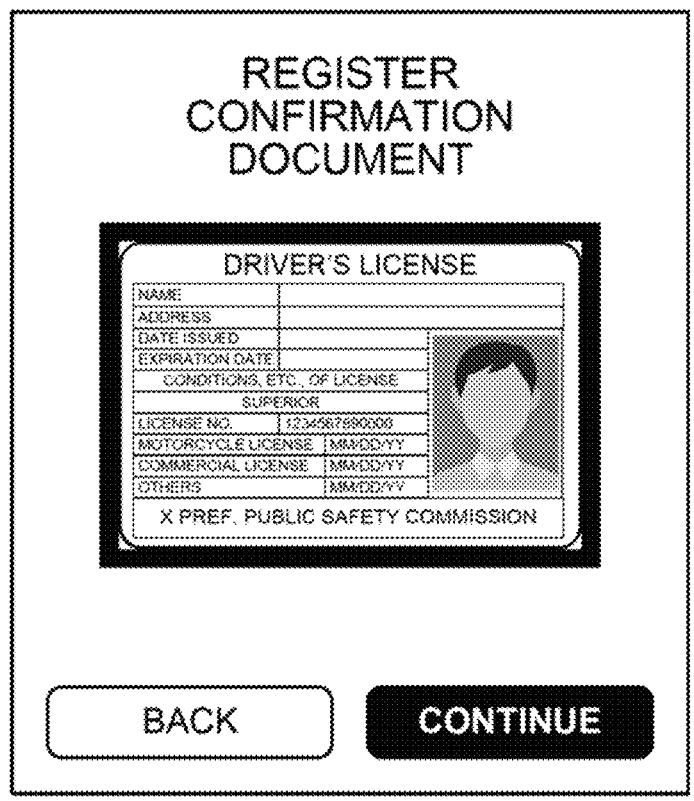
FIG. 8 is a diagram showing a screen example (No. 2) of the mobile terminal at the time of initial registration.

As shown in FIG. 6, when the initial registration is performed, a confirmation document is first registered (step S101). Specifically, when an operation of selecting "new registration" is performed on the screen of the authentication application shown in FIG. 7, a confirmation document registration screen shown in FIG. 8 is displayed. For example, if a driver's license is placed to be within a camera frame and an operation of selecting a "continue" button is performed, an image of the driver's license is transmitted to the management device 20 as the confirmation document.

Thereafter, attribute information is registered (step S102). Specifically, an attribute information registration screen shown in FIG. 9 is displayed on the display unit of the mobile terminal 10. If a name "TARO TANAKA", an address " . . . Tokyo", and a telephone number "03(1234) 5678" are inputted and a "continue" button is selected as shown in FIG. 9, the inputted attribute information is transmitted to the management device 20.

Thereafter, a moving image is registered (step S103). Specifically, the name of the user and a plurality of keywords (for examples, five keywords) are displayed in order, on the display unit of the mobile terminal 10, and when the user utters them, a moving image including the face and the voice of the user is captured and transmitted to the management device 20.

Thereafter, a shared service is registered (step S104). Specifically, among a plurality of financial institutions, a plurality of settlement systems, a plurality of public institution services, etc., the user inputs a financial institution name, a settlement system name, and a public institution service name for which the authentication service is used.

For example, as shown in FIG. 10, account information of the user such as a financial institution name "ABC", a branch name "Akasaka", and an account number "1234567" can be registered, and an identification number information for a settlement system such as electronic money name "DEF" and an identification number "1111111" can be registered.

<Processing Procedure of Management Device 20 at Time of Personal Authentication>

Figure 11:
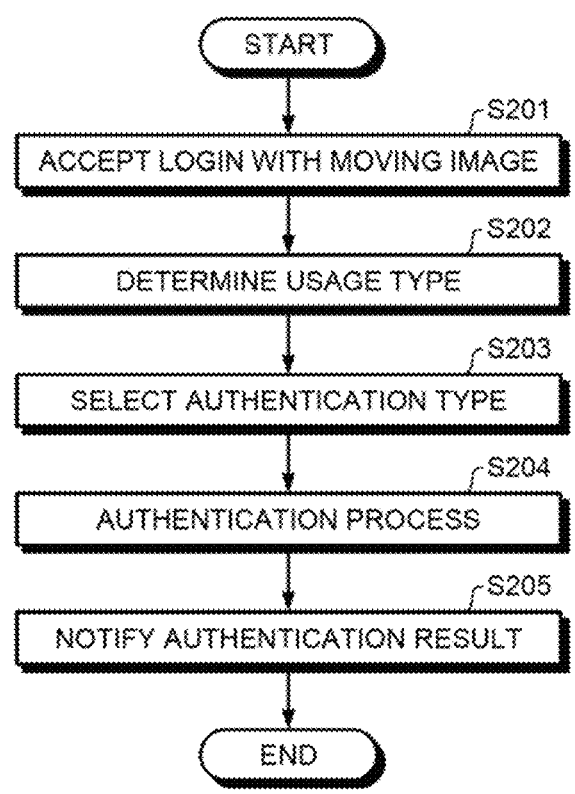
FIG. 11 is a flowchart showing a processing procedure at the time of personal authentication.

Next, the processing procedure of the management device 20 at the time of personal authentication will be described. FIG. 11 is a flowchart showing the processing procedure at the time of personal authentication. Here, it is assumed that the initial registration is completed in advance and login is being performed in the authentication application on the mobile terminal 10. For example, the mobile terminal 10 displays one of the plurality of keywords registered at the time of initial registration, on the display screen of the authentication application, causes the user to utter this keyword, and takes a moving image of the user. Then, the mobile terminal 10 transmits information including the moving image to the management device 20 to perform login with the moving image.

As shown in FIG. 11, after the management device 20 accepts the login with the moving image (step S201), the management device 20 determines a usage type (step S202). For example, the management device 20 acquires information (voice data, text) regarding a situation such as withdrawal of a large amount of money at a financial institution, from the mobile terminal 10 via the authentication application. Thereafter, the management device 20 determines the usage type based on the information acquired from the mobile terminal 10. Thereafter, the management device 20 selects an authentication type based on the usage type (step S203). Specifically, the management device 20 selects an authentication type corresponding to the usage type from among the authentication types 1 to 7 shown in FIG. 4. An authentication type selection can be made by using a table showing the correspondence relationship between preset usage types and authentication types. Alternatively, the management device 20 can also make such a selection by using a learned model obtained through deep learning.

Thereafter, the management device 20 performs an authentication process corresponding to the selected authentication type (step S204). For example, when the authentication process 5 shown in FIG. 4 is selected, dynamic biometric authentication including face authentication, voice authentication (keyword), and lip authentication shown in FIG. 5 is performed. Thereafter, the authentication result is transmitted to the corresponding destination (step S205).

As described above, in the authentication system according to Embodiment 1, the management device 20 is accessed from the mobile terminal 10 of the user A, and initial registration including registration of a moving image of the user A is performed. When the user A uses a service at the branch X of the financial institution ABC or at the convenience store Y, a moving image of the user A is transmitted to the management device 20. The management device 20 performs the authentication process corresponding to the usage type, and notifies the branch or the store of the authentication result. Accordingly, personal authentication can be efficiently performed for various procedures performed by the user A.

In particular, according to Embodiment 1, authentication in a plurality of different types of systems can be efficiently performed regardless of business type. In addition, a cardless environment can be promoted. Furthermore, there is no need to add a dedicated device to the mobile terminal 10 for the authentication. It is sufficient if the mobile terminal 10 has a camera, a microphone, and a communication function and therefore, the range of use of the authentication system can be expanded.

This authentication system can also be applied to the case of performing one-to-N authentication in which one person is authenticated out of N people. Even when a smartphone owned by each user cannot be used due to a disaster, if there is one shared terminal such as a tablet that can take a moving image with voice, personal authentication of the user can be performed by using this shared terminal as the mobile terminal 10 and therefore, the authentication system is extremely effective at the time of a disaster. Depending on the combination of shared systems, items can also be purchased through personal authentication without money at the time of a disaster.

Embodiment 1 describes the case where dynamic biometric authentication, which is the combination of face authentication, the voice authentication 1 (attribute), the voice authentication 2 (keyword), the voice authentication 3 (voiceprint), lip authentication, and iris authentication shown in FIG. 4, is performed, but the present disclosure is not limited thereto, and various types of authentication can be freely combined. Various types of authentication with individual authentication information such as fingerprint authentication and palm print authentication can be used in combination.

Embodiment 1 describes the case where various authentication processes are performed on the management device 20, but the present disclosure is not limited thereto. The authentication process can be performed on the mobile terminal 10, and the authentication result can be notified from the mobile terminal 10 to the management device 20. In this case, the authentication type is notified from the management device 20 to the mobile terminal 10, and the mobile terminal 10 that has received the notification of the authentication type performs the authentication process corresponding to the authentication type.

Embodiment 1 describes the case where the initial registration is performed in advance, but the present disclosure is not limited thereto, and the initial registration and the personal authentication can be performed in succession. Furthermore, the Embodiment 1 describes the case where the authentication type is selected according to the usage type, but the present disclosure is not limited thereto, and the authentication type can be selected by focusing on the situation of the user. In addition, the user and the family of the user can be associated with each other in the system. Furthermore, when the user is an inbound user (foreigner visiting Japan), a low-level authentication type can be selected in their own country, and a high-level authentication type can be selected in Japan.

Embodiment 2

<Outline of Authentication System According to Embodiment 2>

Next, an authentication system in the case where a user located in a country X enters a country Y and uses a service in the country Y will be described. The present embodiment shows the case where a user B performs initial registration for an authentication service in the country X, then leaves the country X, enters the country Y, and uses the service in the country Y. It is assumed that the country Y is Japan.

Figure 12:
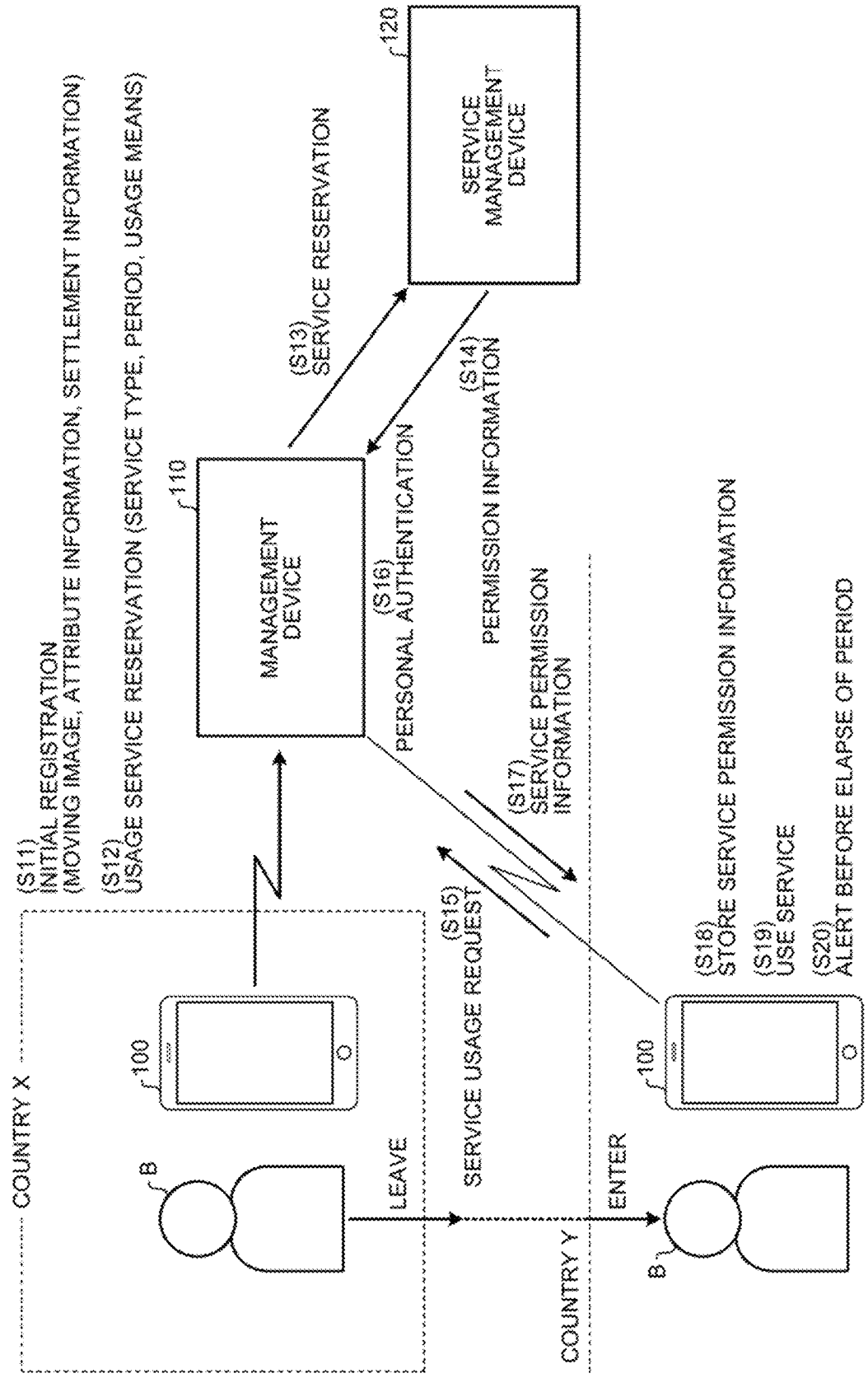
FIG. 12 is a diagram showing an outline of an authentication system according to Embodiment 2.

FIG. 12 is a diagram showing an outline of an authentication system according to Embodiment 2. As shown in FIG. 12, when the user B receives the authentication service by the authentication system, the user B accesses a management device 110 by using a mobile terminal 100 possessed by the user B, and performs initial registration (step S11). In the initial registration, a moving image including a face image and a voice, attribute information (name, passport number, international driver's license number, etc.), settlement information (credit information, bank account information, payment means, etc.), etc., of the user B are registered.

Thereafter, the user B makes a usage service reservation (step S12). In the usage service reservation, a service type, a period, a usage means, etc. are registered. For example, when an inbound user uses private lodging (so-called "Minpaku" in Japanese), a service type "private lodging", a period "Feb. 1 to Feb. 10, 2019", and a usage means "two-dimensional bar code" are registered.

The management device 110 makes a service reservation to a service management device 120 of a service management company (step S13). When the service management company can provide the corresponding service, the service management device 120 transmits permission information as a reply, to the management device 110 (step S14). The permission information includes, for example, information of a two-dimensional barcode that is a key when using the private lodging.

Then, when the user B enters the country Y, that is, Japan, and uses the private lodging, the user B launches an authentication application in the mobile terminal 100, accesses the management device 110, and performs a process for a service usage request including transmission of a moving image of the user B (step S15). The management device 110 that has received the service usage request performs personal authentication by using the received moving image (step S16). At this time, the management device 110 can perform an authentication process using the dynamic biometric authentication described in Embodiment 1. As a result, if the personal authentication is performed correctly, the management device 110 transmits service permission information to the mobile terminal 100 (step S17). The service permission information includes, for example, a two-dimensional bar code that is a key for the private lodging.

If the mobile terminal 100 receives the service permission information from the management device 110, the mobile terminal 100 stores the service permission information in a memory within the mobile terminal 100 (step S18), and uses the service permission information for the service (step S19). In the case of the private lodging, the key of a house or condominium for the private lodging can be unlocked with the two-dimensional bar code.

The user B can unlock the house or condominium by using the two-dimensional bar code included in the service permission information. An alert is issued to the mobile terminal 100 before the period registered in the usage service reservation (step S20) elapses, and the key cannot be unlocked after this period elapses.

As described above, in the authentication system of Embodiment 2, a foreigner visiting Japan can efficiently perform personal authentication in Japan. Therefore, it is possible for the foreigner visiting Japan to efficiently uses a service in Japan. For example, when a foreigner visiting Japan uses private lodging, it is possible to go directly to the corresponding house or condominium and unlock the house or condominium by using the two-dimensional bar code included in the service permission information. The fee required for the service can be collected from the user by using the settlement system registered at the time of initial registration.

<Configuration of Management Device 110>

Figure 13:
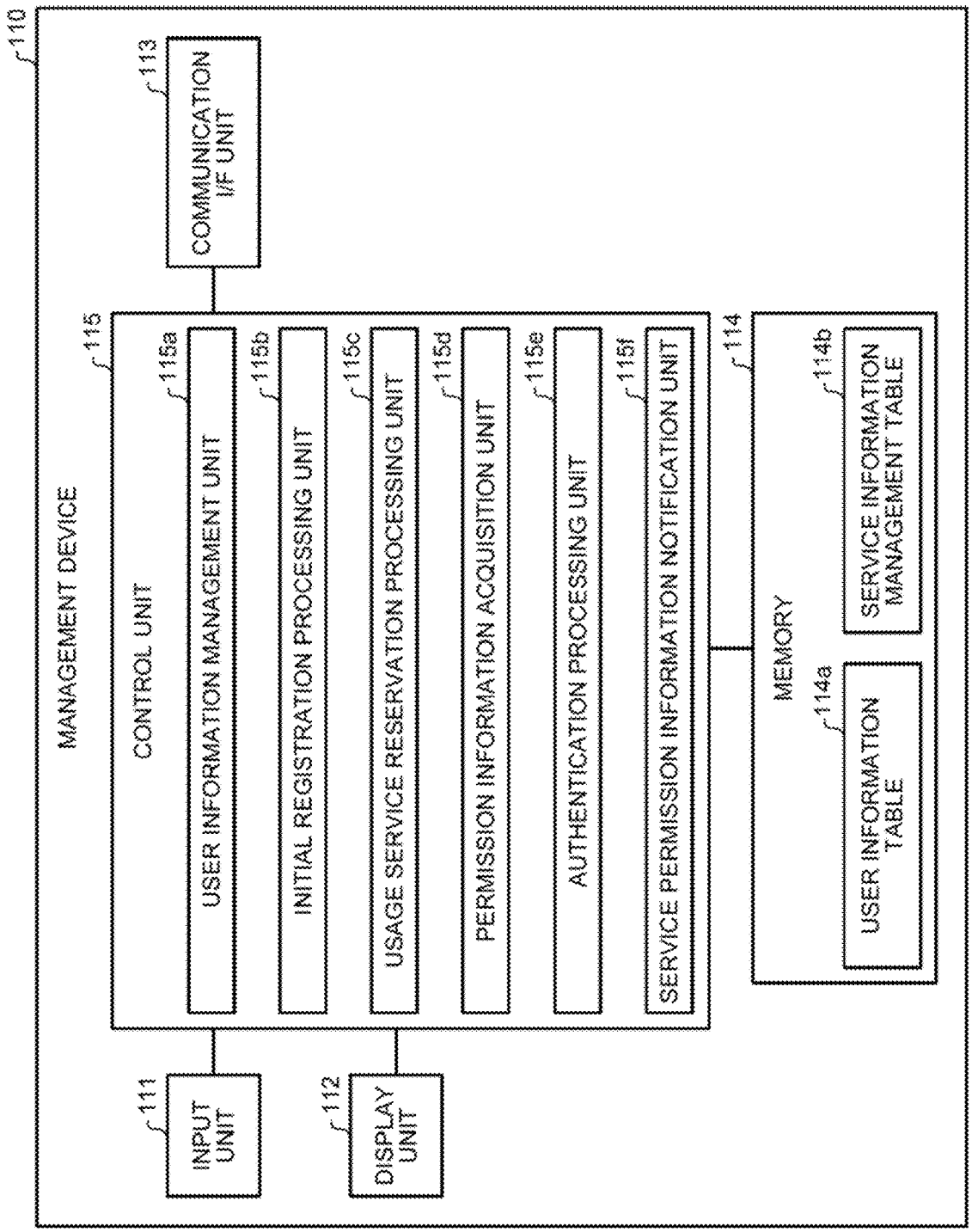
FIG. 13 is a functional block diagram showing the configuration of a management device shown in FIG. 12.

Next, the configuration of the management device 110 shown in FIG. 12 will be described. FIG. 13 is a functional block diagram showing the configuration of the management device 110 shown in FIG. 12. As shown in FIG. 13, the management device 110 includes an input unit 111, a display unit 112, a communication I/F unit 113, a memory 114, and a control unit 115.

The input unit 111 is an input device such as a keyboard and a mouse. The display unit 112 is a display device such as a liquid crystal panel or a liquid crystal display. The communication I/F unit 113 performs communication with the mobile terminal 100, the service management device 120, etc.

The memory 114 is a secondary storage unit such as a hard disk drive or a non-volatile memory. The memory 114 stores a user information table 114a and a service information management table 114b. The user information table 114a includes attribute information, authentication information, reservation service information, etc., for each piece of user identification information that uniquely identifies a user. The attribute information includes personal information such as the name, the passport number, the telephone number, etc., of the user. The authentication information includes a moving image including the face and the voice of the user, etc. The reserved service information includes information about the service reserved by the user. The service information management table 114b is a table that manages access destination information of service management devices 120 of various services that can be provided to the user.

The control unit 115 controls the entirety of the management device 110. The control unit 115 includes a user information management unit 115a, an initial registration processing unit 115b, a usage service reservation processing unit 115c, a permission information acquisition unit 115d, an authentication processing unit 115e, and a service permission information notification unit 115f. In actuality, programs corresponding to these functional units are stored in a ROM or a nonvolatile memory, and these programs are loaded to a CPU and executed, thereby causing the CPU to perform processes corresponding to the user information management unit 115a, the initial registration processing unit 115b, the usage service reservation processing unit 115c, the permission information acquisition unit 115d, the authentication processing unit 115e, and the service permission information notification unit 115f.

The user information management unit 115a manages the information for each user by using the user information table 114a stored in the memory 114. As described above, the attribute information, the authentication information, the reservation service information, etc., of each user are registered in the user information table 114a. The user information management unit 115a performs a process of updating the items of information, etc.

The initial registration processing unit 115b performs initial registration when the user newly uses the authentication system. Specifically, a confirmation document such as the passport or the international driver's license, attribute information such as the name of the user, authentication information such as a moving image, and settlement information are registered through the authentication application. Although the case of using the authentication application is shown here, the user can access an HTTP server by using a web browser, and perform the initial registration on the web browser.

The usage service reservation processing unit 115c reserves a service to be used by the user. The usage service reservation processing unit 115c reserves a usage service type, a period, and a usage means. The permission information acquisition unit 115d acquires permission information from the service management device 120 corresponding to the service reserved for the user. The permission information includes, for example, a two-dimensional bar code that is a key for private lodging.

The authentication processing unit 115e performs dynamic biometric authentication using a moving image. The details of the dynamic biometric authentication are the same as in Embodiment 1, and thus the detailed description thereof is omitted. The service permission information notification unit 115f notifies the mobile terminal 100 of the user of service permission information. The service permission information includes, for example, a two-dimensional bar code that is a key when using the private lodging.

<Initial Registration Process>

Figure 14:
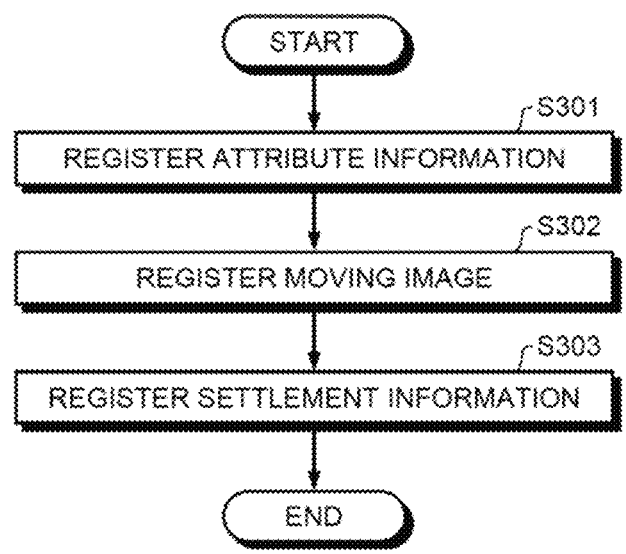
FIG. 14 is a flowchart showing a processing procedure at the time of initial registration.

Next, an initial registration process by the management device 110 shown in FIG. 13 will be described. FIG. 14 is a flowchart showing a processing procedure at the time of initial registration by the management device 110 shown in FIG. 13. As shown in FIG. 14, attribute information is first registered (step S301). The attribute information includes an image in a passport or an international driver's license, a name, a passport number, a telephone number, etc.

Thereafter, a moving image including a face and a voice of the user is captured by using the mobile terminal 100, and the captured moving image is registered (step S302). When capturing the moving image, the mobile terminal 100 makes the user utter the user's name and a plurality of keywords, and each moving image is registered.

Thereafter, settlement information of the user is registered (step S303). Specifically, a financial institution name, a branch name, and an account number of a financial institution, an identification number for electronic money, etc., are registered.

<Processing Procedure of Management Device 110 at Time of Service Reservation>

Figure 15:
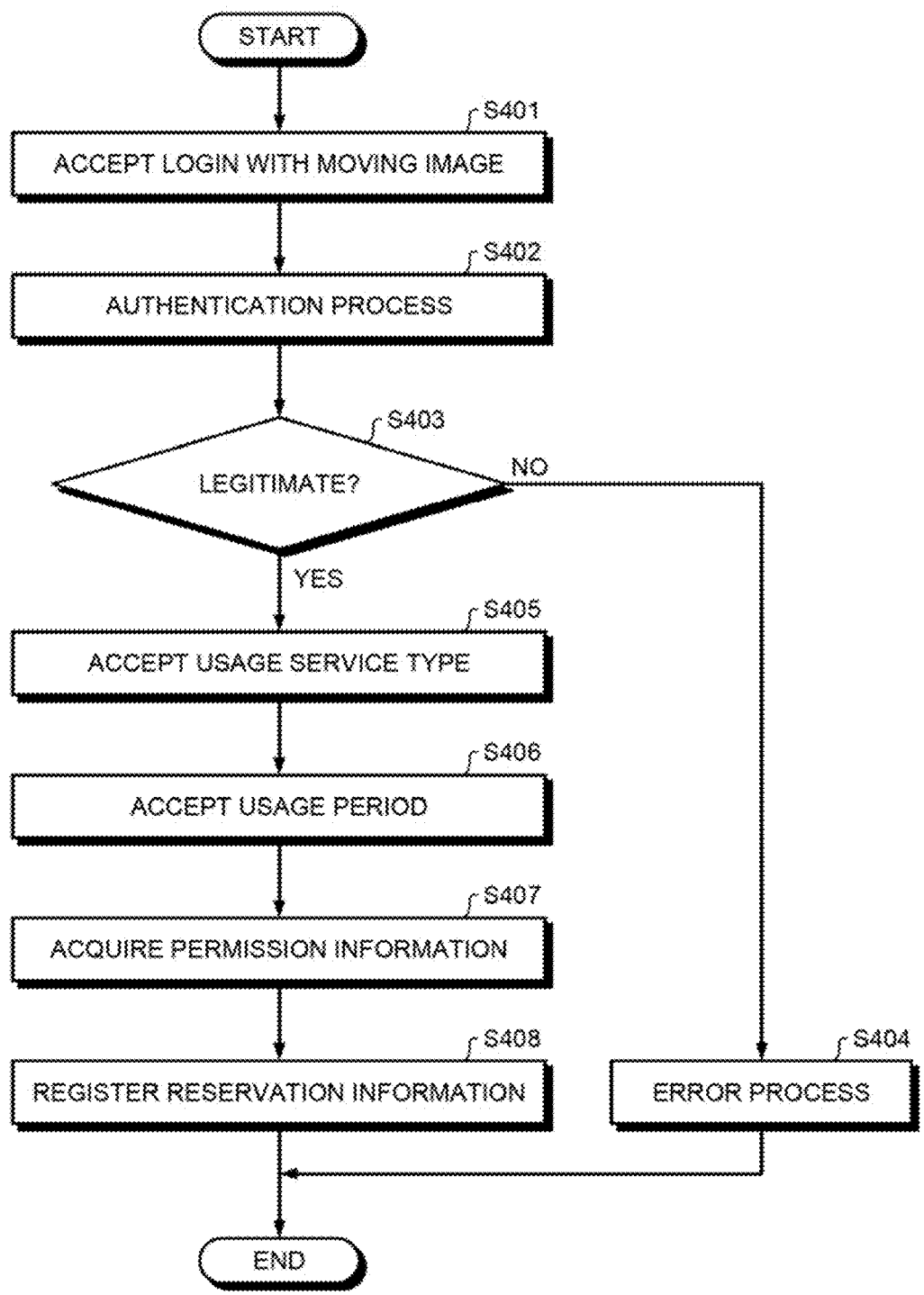
FIG. 15 is a flowchart showing a processing procedure at the time of service reservation.

Next, the processing procedure of the management device 110 at the time of service reservation will be described. FIG. 15 is a flowchart showing the processing procedure of the management device 110 at the time of service reservation. Here, it is assumed that the initial registration is completed in advance. For example, the mobile terminal 100 displays one of the plurality of keywords registered at the time of initial registration, on the display screen of the authentication application, causes the user to utter this keyword, and takes a moving image of the user. Then, the mobile terminal 100 transmits information including the moving image to the management device 110 to perform login with the moving image.

When the management device 110 accepts the login with the moving image (step S401), the management device 110 performs an authentication process with dynamic biometric information using the moving image (step S402). As a result, when it is determined that the person is not the legitimate person (step S403; No), the management device 110 performs an error process (step S404) and ends the processing.

On the other hand, when it is determined that the person is the legitimate person (step S403; Yes), the management device 110 receives the type of a service to be used (for example, use of private lodging) (step S405) and receives a usage period (step S406).

Thereafter, the management device 110 accesses the corresponding service management device 120 to acquire permission information (step S407), registers reservation information in the user information table 114a (step S408), and ends the above series of processes.

<Processing Procedure of Management Device 110 at Time of Service Process>

When the user uses a service, the management device 110 accepts login with a moving image, similar to the time of the service reservation. Thereafter, the management device 110 performs an authentication process with dynamic biometric information using a moving image. When it is determined that the person is the legitimate person, service permission information is notified to the mobile terminal 100.

As described above, in the authentication system of Embodiment 2, a foreigner visiting Japan can efficiently perform personal authentication in Japan. Therefore, it is possible for the foreigner visiting Japan to efficiently use a service in Japan. For example, when a foreigner visiting Japan uses private lodging, it is possible to go directly to the corresponding house or condominium and unlock the house or condominium using the two-dimensional bar code included in service permission information. The fee required for the service can be collected from the user by using the settlement system registered at the time of initial registration.

Embodiment 2 describes the case of using private lodging for which unlocking can be performed with a two-dimensional bar code, but the present disclosure is not limited thereto, and can also be applied to the case of unlocking a key using short-range wireless communication. In addition, the service type is not limited to the private lodging, and the present disclosure can also be used for hotel reservation and car sharing.

Moreover, in order to identify the user, a postal mail that can be received only by the user may be sent to the address obtained from an official certificate to confirm the identity of the user, the user may be guided to a verification website by a two-dimensional bar code or the like in which an authentication URL is written and which is attached to the postal mail, and face authentication, voice authentication, etc., may be performed again, thereby further preventing spoofing.

Figure 16:
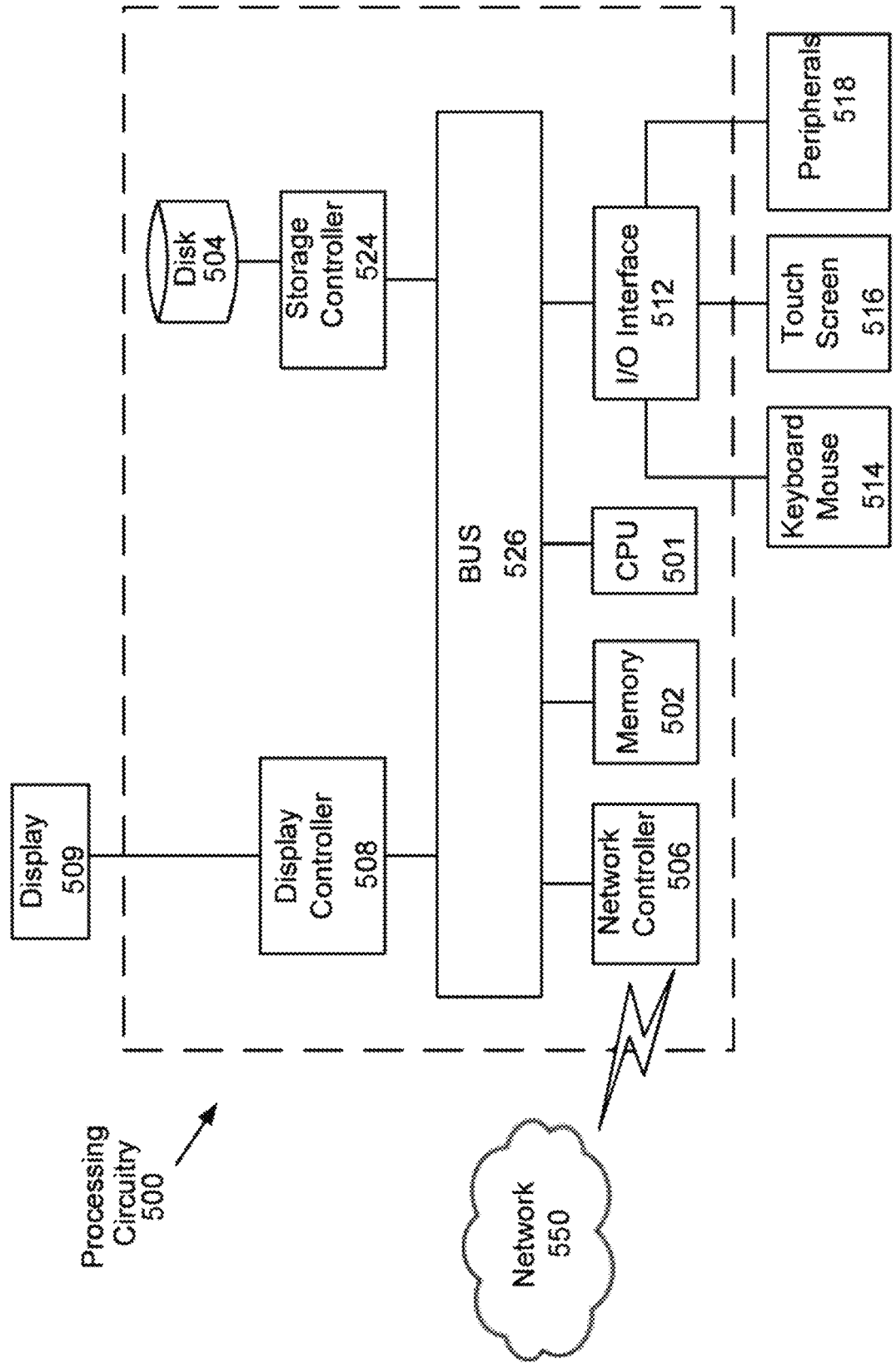
FIG. 16 is a block diagram of processing circuitry that performs computer-based operations in accordance with the present disclosure.

FIG. 16 is a block diagram of processing circuitry that performs computer-based operations in accordance with the present disclosure. FIG. 16 illustrates processing circuitry 500 of control unit 25 and of management device 20 and control unit 115 of management device 110.

Processing circuitry 500 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 16, the processing circuitry 500 includes a CPU 501 which performs one or more of the control processes discussed in this disclosure. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 500 communicates, such as a server or computer. The processes may also be stored in network based storage, cloud-based storage or other mobile accessible storage and executable by processing circuitry 500.

Further, the claimed advancements may be provided as a utility application, background daemon, or component of an operating system, or combination thereof, executing in conjunction with CPU 501 and an operating system such as Microsoft Windows, UNIX, Solaris, LINUX, Apple MAC-OS, Apple iOS and other systems known to those skilled in the art.

The hardware elements in order to achieve the processing circuitry 500 may be realized by various circuitry elements. Further, each of the functions of the above described embodiments may be implemented by circuitry, which includes one or more processing circuits. A processing circuit includes a particularly programmed processor, for example, processor (CPU) 501, as shown in FIG. 16. A processing circuit also includes devices such as an application specific integrated circuit (ASIC) and conventional circuit components arranged to perform the recited functions.

In FIG. 16, the processing circuitry 500 may be a computer or a particular, special-purpose machine. Processing circuitry 500 is programmed to execute processing to management device 20/115.

Alternatively, or additionally, the CPU 501 may be implemented on an FPGA, ASIC, PLD or using discrete logic circuits, as one of ordinary skill in the art would recognize. Further, CPU 501 may be implemented as multiple processors cooperatively working in parallel to perform the instructions of the inventive processes described above.

The processing circuitry 500 in FIG. 16 also includes a network controller 506, such as an Ethernet PRO network interface card, for interfacing with network 550. As can be appreciated, the network 550 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 550 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 506 may be compliant with other direct communication standards, such as Bluetooth, a near field communication (NFC), infrared ray or other.

The processing circuitry 500 further includes a display controller 508, such as a graphics card or graphics adaptor for interfacing with display 509, such as a monitor. An I/O interface 512 interfaces with a keyboard and/or mouse 514 as well as a touch screen panel 516 on or separate from display 109. I/O interface 512 also connects to a variety of peripherals 518.

The storage controller 524 connects the storage medium disk 504 with communication bus 526, which may be an ISA, EISA, VESA, PCI, or similar, for interconnecting all of the components of the processing circuitry 500. A description of the general features and functionality of the display 509, keyboard and/or mouse 514, as well as the display controller 508, storage controller 524, network controller 506, and I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In one aspect of the present disclosure, an authentication system has an authentication information management unit configured to manage a plurality of items of authentication information for authenticating a user, and the authentication system includes: a usage type determination unit configured to determine a predetermined usage type; an authentication type selection unit configured to select an authentication type corresponding to the usage type determined by the usage type determination unit, from among a plurality of authentication types; an authentication processing unit configured to perform an authentication process for the user based on the authentication type selected by the authentication type selection unit; and a notification unit configured to notify a result of authentication of the user by the authentication processing unit.

In the above configuration, the authentication processing unit performs an authentication process including at least dynamic biometric authentication using a moving image including a face portion of the user and a voice of the user.

In the above configuration, in the dynamic biometric authentication, an authentication process including a face authentication process based on a face image of the user included in the moving image and a voice authentication process based on voice information of the user included in the moving image is performed.

In the above configuration, the face authentication process is a process of collating the face image of the user included in the moving image with a face image included in the authentication information managed by the authentication information management unit.

In the above configuration, the authentication information managed by the authentication information management unit is information on a certificate including a face image of the user and issued by a public institution.

In the above configuration, the voice authentication process is a process of collating attribute information on the user indicated by a voice uttered by the user with attribute information included in the authentication information managed by the authentication information management unit.

In the above configuration, the voice authentication process is a process of collating a keyword indicated by a voice uttered by the user with a predetermined keyword that the user has been previously requested to utter.

In the above configuration, the voice authentication process is a process of collating voiceprint information of the user included in a voice uttered by the user with voiceprint information included in the authentication information managed by the authentication information management unit.

In the above configuration, the dynamic biometric authentication includes lip authentication for authenticating whether movement of a lip of the user included in the moving image matches a keyword indicated by a voice of the user included in the moving image.

In the above configuration, the authentication process in the authentication processing unit is executed by a management device configured to communicate with a mobile terminal possessed by the user.

In the above configuration, the authentication process by the authentication processing unit is executed in the mobile terminal possessed by the user.

In the above configuration, authentication information to be managed by the authentication information management unit is registered from the mobile terminal possessed by the user.

In one aspect of the present disclosure, a management device has an authentication information management unit configured to manage a plurality of items of authentication information for authenticating a user, and the management device includes: a usage type determination unit configured to determine a predetermined usage type; an authentication type selection unit configured to select an authentication type corresponding to the usage type determined by the usage type determination unit, from among a plurality of authentication types; an authentication processing unit configured to perform an authentication process for the user based on the authentication type selected by the authentication type selection unit; and a notification unit configured to notify a result of authentication of the user by the authentication processing unit.

In one aspect of the present disclosure, an authentication method in an authentication system having an authentication information management unit configured to manage a plurality of items of authentication information for authenticating a user, includes: a usage type determination step of determining a predetermined usage type; an authentication type selection step of selecting an authentication type corresponding to the usage type determined in the usage type determination step, from among a plurality of authentication types; an authentication processing step of performing an authentication process for the user based on the authentication type selected in the authentication type selection step; and a notification step of notifying a result of authentication of the user in the authentication processing step.

According to the present disclosure, authentication can be efficiently performed when a user performs various procedures.

The constituent elements described in Embodiment 1 or 2 described above are conceptually functional constituent elements, and thus may not be necessarily configured as physical constituent elements, as illustrated in the drawings. That is, distributed or integrated forms of each device are not limited to the forms illustrated in the drawings, and all or some of the forms may be distributed or integrated functionally or physically in any unit depending on various loads, use statuses, or the like.

The authentication system, the management device, and the authentication method according to the present disclosure are useful in efficiently performing personal authentication when the user performs various procedures.

The invention claimed is:

1. An authentication system, comprising:
a memory configured to store personal information on a user, authentication information including biometric data uniquely identifying the user, information on a plurality of services to which the authentication system is applied for the user, and a plurality of authentication types having different levels of authentication; and
processing circuitry configured to:
manage the authentication information, stored in the memory, for authenticating the user;
determine, based on information on a service to be authenticated from the plurality of services indicated in the authentication information, a usage type corresponding to the service to be authenticated;
select an authentication type, from among the plurality of authentication types stored in the memory, corresponding to the usage type, wherein the authentication type is selected so that, for the usage type, a predetermined level of authentication is selected according to the service to be authenticated;
perform, using a moving image including a face portion of the user and a voice of the user, an authentication process for the user based on the authentication type; and
output a result of the authentication process, wherein
to perform the authentication process, the processing circuitry is configured to perform dynamic biometric authentication including:
a face authentication process to authenticate the user based on a face image of the user included in the moving image,
a voice authentication process to authenticate the user based on voice information of the voice of the user included in the moving image, and
a lip authentication process to authenticate whether movement of a lip of the user included in the moving image matches a keyword indicated by a voice of the user included in the moving image.

2. The authentication system according to claim 1, wherein the face authentication process includes collating the face image of the user included in the moving image with a face image included in the authentication information.

3. The authentication system according to claim 1, wherein the authentication information is information on a certificate including a face image of the user and issued by a public institution.

4. The authentication system according to claim 1, wherein the voice authentication process includes collating attribute information on the user indicated by a voice uttered by the user with attribute information included in the authentication information.

5. The authentication system according to claim 1, wherein the voice authentication process includes collating a keyword indicated by a voice uttered by the user with a predetermined keyword that the user has been previously requested to utter.

6. The authentication system according to claim 1, wherein the voice authentication process includes collating voiceprint information of the user included in a voice uttered by the user with voiceprint information included in the authentication information.

7. The authentication system according to claim 1, further comprising a management device, wherein
the management device includes the processing circuitry, and
the management device is configured to communicate with a mobile terminal possessed by the user.

8. The authentication system according to claim 1, wherein the processing circuitry instructs a mobile terminal of the user to execute the authentication process.

9. The authentication system according to claim 1, wherein authentication information is registered from a mobile terminal possessed by the user.

10. A management device, comprising:
a memory configured to store personal information on a user, authentication information including biometric data uniquely identifying the user, information on a plurality of services to which the authentication system is applied for the user, and a plurality of authentication types having different levels of authentication;
a usage type determination circuit configured to determine, based on information on a service to be authenticated from the plurality of services indicated in the authentication information, a usage type corresponding to the service to be authenticated;
an authentication type selection circuit configured to select an authentication type, from among the plurality of authentication types stored in the memory, corresponding to the usage type, wherein the authentication type is selected so that, for the usage type, a predetermined level of authentication is selected according to the service to be authenticated;
an authentication processing circuit configured to perform, using a moving image including a face portion of the user and a voice of the user, an authentication process for the user based on the authentication type; and
a notification circuit configured to notify a mobile terminal of the user of a result of authentication process, wherein
to perform the authentication process. the authentication processing circuit is configured to perform dynamic biometric authentication including:
a face authentication process to authenticate the user based on a face image of the user included in the moving image,
a voice authentication process to authenticate the user based on voice information of the voice of the user included in the moving image, and
a lip authentication process to authenticate whether movement of a lip of the user included in the moving image matches a keyword indicated by a voice of the user included in the moving image.

11. The management device according to claim 10, wherein the face authentication process includes collating the face image of the user included in the moving image with a face image included in the authentication information.

12. The management device according to claim 10, wherein the authentication information is information on a certificate including a face image of the user and issued by a public institution.

13. The management device according to claim 10, wherein the voice authentication process includes collating attribute information on the user indicated by a voice uttered by the user with attribute information included in the authentication information.

14. The management device according to claim 10, wherein authentication information is registered from the mobile terminal possessed by the user.

15. An authentication method in an authentication system, the authentication method comprising:
storing, in a memory, personal information on a user, authentication information including biometric data uniquely identifying the user, information on a plurality of services to which the authentication system is applied for the user, and a plurality of authentication types having different levels of authentication;
determining, based on information on a service to be authenticated from the plurality of services indicated in the authentication information, a usage type corresponding to the service to be authenticated;
selecting an authentication type, from among the plurality of authentication types stored in the memory, corresponding to the usage type, wherein the authentication type is selected so that, for the usage type, a predetermined level of authentication is selected according to the service to be authenticated;
performing, using a moving image including a face portion of the user and a voice of the user an authentication process for the user based on the authentication type; and
outputting a result of authentication of the user in the authentication process, wherein
the performing the authentication process includes dynamic biometric authentication including:
performing a face authentication process to authenticate the user based on a face image of the user included in the moving image,
performing a voice authentication process to authenticate the user based on voice information of the voice of the user included in the moving image, and
performing a lip authentication process to authenticate whether movement of a lip of the user included in the moving image matches a keyword indicated by a voice of the user included in the moving image.

* * * * *